United States Patent
Hosaka

(10) Patent No.: US 9,373,352 B2
(45) Date of Patent: Jun. 21, 2016

(54) OPTICAL INFORMATION REPRODUCTION APPARATUS AND OPTICAL INFORMATION REPRODUCTION METHOD

(71) Applicant: Hitachi Consumer Electronics Co., Ltd., Kanagawa (JP)

(72) Inventor: Makoto Hosaka, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 14/649,327

(22) PCT Filed: Dec. 10, 2012

(86) PCT No.: PCT/JP2012/081873
§ 371 (c)(1),
(2) Date: Jun. 3, 2015

(87) PCT Pub. No.: WO2014/091531
PCT Pub. Date: Jun. 19, 2014

(65) Prior Publication Data
US 2015/0318012 A1    Nov. 5, 2015

(51) Int. Cl.
*G11B 7/0065*    (2006.01)
*G11B 7/135*    (2012.01)
(Continued)

(52) U.S. Cl.
CPC ............ *G11B 7/1392* (2013.01); *G02B 27/283* (2013.01); *G03H 1/2286* (2013.01);
(Continued)

(58) Field of Classification Search
CPC ....... G03H 1/2286; G03H 1/265; G03H 1/28; G03H 2001/186; G11B 7/0065; G11B 7/083; G11B 7/08564; G11B 7/1353; G11B 7/1392; G11B 7/00772; G11B 7/1395; G11B 7/1378; G11B 7/1362; G11B 7/1381; G02B 27/283; G02B 23/2469; G02B 23/26; G02B 26/10; G02B 26/103; A61B 1/00006; A61B 1/00172; A61B 1/063; G01J 1/4257
See application file for complete search history.

(56) References Cited

U.S. PATENT DOCUMENTS

| 2010/0246371 A1* | 9/2010 | Kanamaru | G11B 7/083 369/112.27 |
| 2013/0201808 A1* | 8/2013 | Ishii | G11B 7/0065 369/47.49 |
| 2014/0332677 A1* | 11/2014 | Fujiwara | A61B 1/00172 250/234 |

FOREIGN PATENT DOCUMENTS

| JP | 2004-272268 A | 9/2004 |
| JP | 2006-171380 A | 6/2006 |

(Continued)

OTHER PUBLICATIONS

International Search Report of PCT/JP2012/081873.

*Primary Examiner* — Dionne H Pendleton
(74) *Attorney, Agent, or Firm* — Mattingly & Malur, PC

(57) ABSTRACT

An optical information reproduction apparatus using holography can appropriately correct an angle and a wavelength of a reference beam in a direction perpendicular to multiplexing while data is reproduced. In the optical information reproduction apparatus which reproduces information from an optical information recording medium by using holography, an angular error signal in the direction perpendicular to multiplexing of the reference beam is generated by using a signal detected by a light detecting unit. A perpendicular angle adjustment element adjusts an angle of the reference beam in the direction perpendicular to multiplexing, based on the angular error signal. A wavelength error signal is generated from a signal detected by the light detecting unit, and a wavelength is adjusted based on the wavelength error signal.

15 Claims, 19 Drawing Sheets

(51) Int. Cl.
*G02B 26/10* (2006.01)
*G11B 7/1392* (2012.01)
*G11B 7/1353* (2012.01)
*G11B 7/1365* (2012.01)
*G11B 7/1381* (2012.01)
*G11B 7/1395* (2012.01)
*G02B 27/28* (2006.01)
*G03H 1/26* (2006.01)
*G11B 7/1362* (2012.01)
*G11B 7/08* (2006.01)
*G03H 1/22* (2006.01)
*G11B 7/085* (2006.01)

(52) U.S. Cl.
CPC ............ *G03H 1/265* (2013.01); *G11B 7/0065* (2013.01); *G11B 7/083* (2013.01); *G11B 7/135* (2013.01); *G11B 7/1353* (2013.01); *G11B 7/1362* (2013.01); *G11B 7/1365* (2013.01); *G11B 7/1381* (2013.01); *G11B 7/1395* (2013.01); *G11B 7/08564* (2013.01)

(56) References Cited

FOREIGN PATENT DOCUMENTS

| | | |
|---|---|---|
| JP | 2006-268933 A | 10/2006 |
| JP | 2009-015932 A | 1/2009 |
| JP | 2010-170616 A | 8/2010 |
| JP | 2011-227967 A | 11/2011 |
| JP | 2011-238317 A | 11/2011 |
| WO | 2009/044470 A1 | 4/2009 |
| WO | 2011/013172 A1 | 2/2011 |
| WO | 2011/108105 A1 | 9/2011 |

* cited by examiner (a)      (b)

Fig. 12
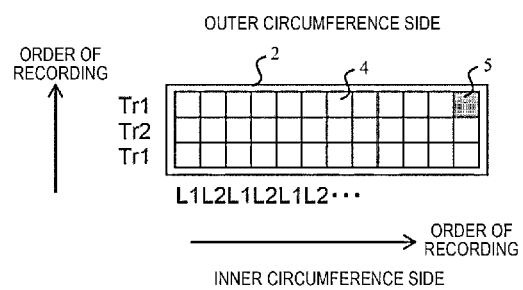
[Fig. 13]
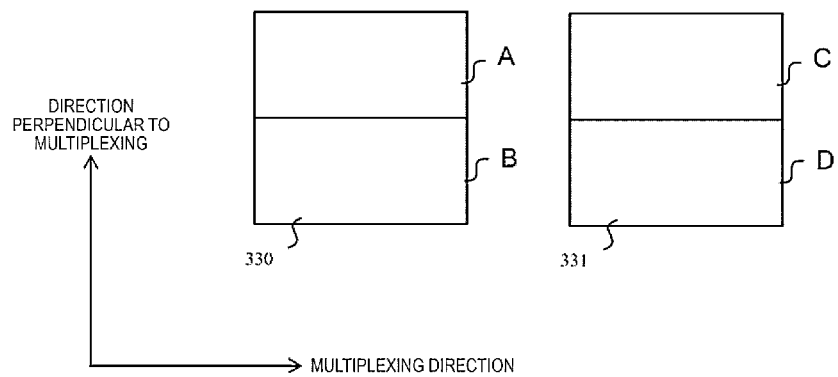

Fig. 16
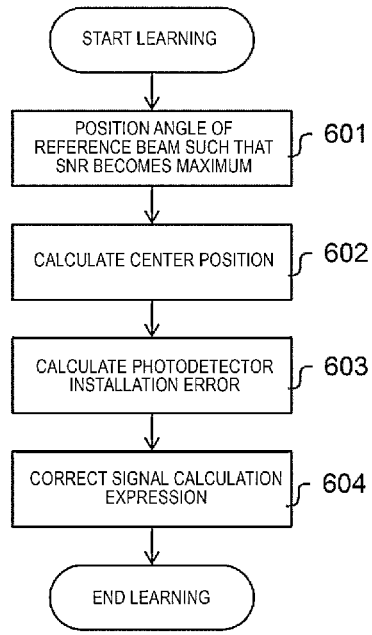
[Fig. 17]
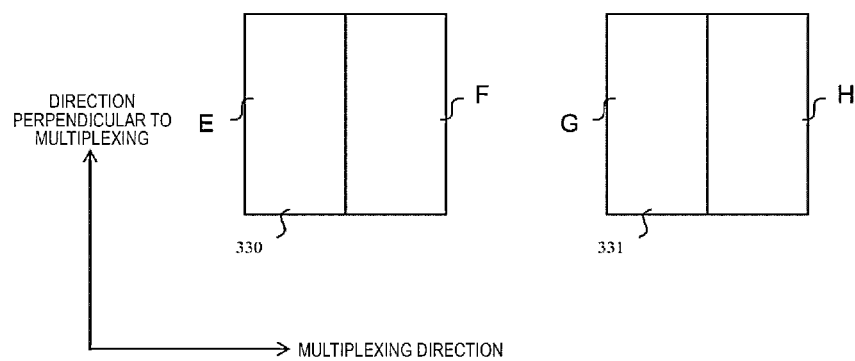

Fig. 18

| AMOUNT OF REFERENCE BEAM ANGLE SHIFT IN MULTIPLEXING DIRECTION | | | DIFFERENCE BETWEEN VECTOR OF -0.002° AND VECTOR OF 0.002° |
|---|---|---|---|
| -0.002° | 0.000° | 0.002° | |

OPTICAL INFORMATION REPRODUCTION APPARATUS AND OPTICAL INFORMATION REPRODUCTION METHOD

TECHNICAL FIELD

The present invention relates to an apparatus and a method of reproducing information by using holography.

BACKGROUND ART

Currently, the standard of the Blu-ray Disc™ using a blue purple semiconductor laser allows an optical disc for the public having recording density of substantially 100 GB to be commercialized. Henceforth, an optical disc having high capacity which exceeds 500 GB is desired. However, a new technology of realizing high density, which is different from the technology of realizing high density by using short wavelength and high NA of an objective lens in the related art, is required in order to realize such an ultra-dense optical disc.

Research relating to a next-generation storage technology has been performed and a hologram recording technology of recording digital information using holography attracts attention. An example of the hologram recording technology includes JP-A-2004-272268 (PTL 1). This publication discloses a so-called angle multiplexing type in which data of pages which are different from each other is displayed in a spatial light modulator and multiplexed recording is performed while an incident angle of a reference beam to an optical information recording medium is changed.

An example of a technology of optimizing a reference beam angle includes JP-A-2011-227967 (PTL 2). This publication discloses that "a photodetector detects diffraction light which is diffracted by irradiating an optical information recording medium in which information is recorded, with an adjustment beam having the same amplitude distribution and phase distribution as those of at least some of signal beams in recording and diffraction light and an angle of causing the reference beam to be incident to an optical information recording medium is controlled based on detected information."

CITATION LIST

Patent Literature

PTL 1: JP-A-2004-272268
PTL 2: JP-A-2011-227967

SUMMARY OF INVENTION

Technical Problem

In an optical information reproduction apparatus using holography, there is a problem in that if an angle or a wavelength of the reference beam in a direction perpendicular to multiplexing is not appropriately set, sufficient reproduction characteristics are not obtained. In a technology disclosed in PTL 2, there is a problem in that an adjustment beam is required to be applied on all such occasions in order to calculate an optimal angle of the reference beam in the direction perpendicular to multiplexing, and a transmission speed is degraded. A technology of performing correction of a wavelength is not disclosed.

Considering the above problems, an object of the invention is to provide an optical information reproduction apparatus and an optical information reproduction method which can appropriately correct an angle and a wavelength of a reference beam in a direction perpendicular to multiplexing while data is reproduced.

Solution to Problem

The above problems are solved by dividing a reference beam into plural reference beams and detecting a plurality of reference beams after the divided reference beams pass through a recording medium.

Advantageous Effects of Invention

According to the invention, it is possible to provide an optical information reproduction apparatus and a method thereof which can appropriately correct an angle and a wavelength of a reference beam in a direction perpendicular to multiplexing while data is reproduced, in a holographic memory.

BRIEF DESCRIPTION OF DRAWINGS

FIG. 12 is a schematic diagram illustrating an example of an order of recording a book in the bookcase of the optical information recording and reproduction apparatus.

FIG. 13 is a schematic diagram illustrating an embodiment of a photodetector in the optical information recording and reproduction apparatus.

FIG. 16 is a diagram illustrating an embodiment of a learning operation flow for photodetector installation error amount.

FIG. 17 is a schematic diagram illustrating an embodiment of the photodetector in the optical information recording and reproduction apparatus.

FIG. 18 is a diagram illustrating an example of a reproduction page when a wavelength is deviated and an angle of the reference beam in the multiplexing direction is shifted.

DESCRIPTION OF EMBODIMENTS

Hereinafter, an embodiment according to the invention will be described with reference to the accompanying drawings.

Embodiment 1

A first embodiment according to the invention will be described with reference to FIGS. 1 to 16.

Figure 1:
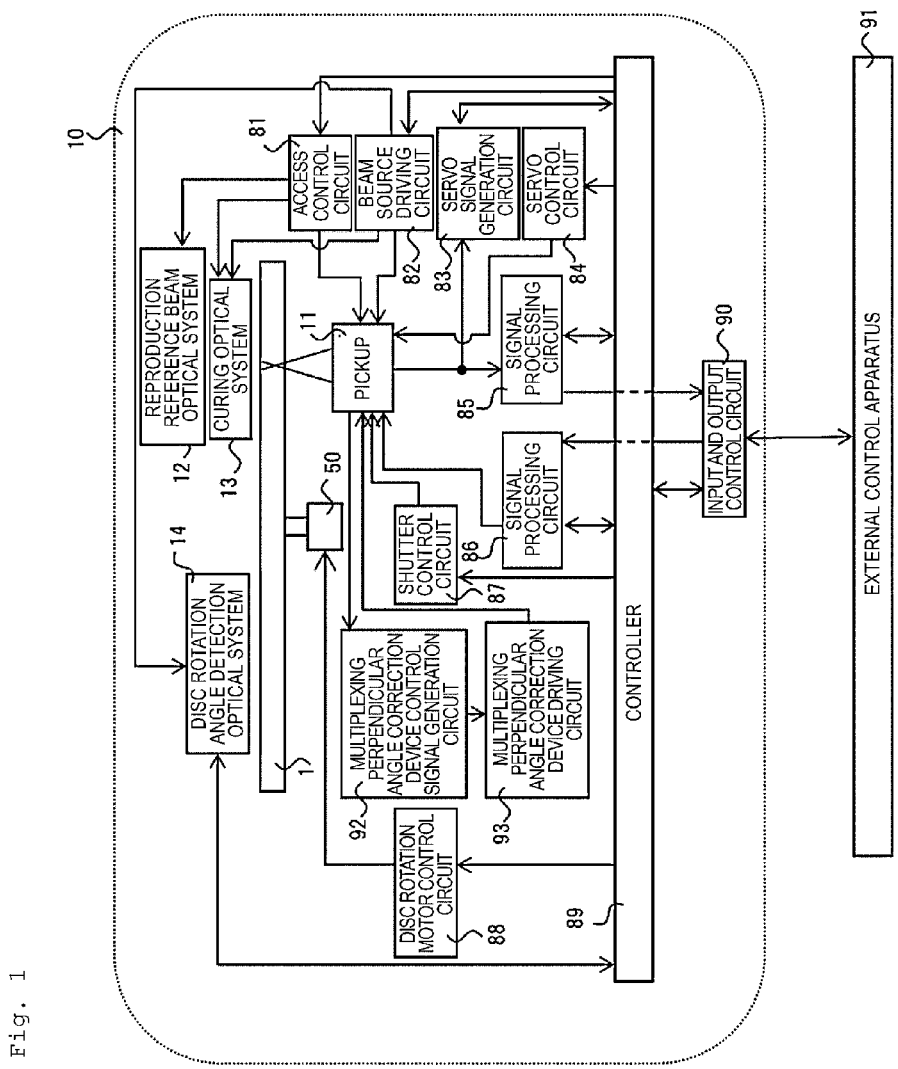
FIG. 1 is a schematic diagram illustrating an embodiment of an optical information recording and reproduction apparatus.

FIG. 1 is a block diagram illustrating a recording and reproduction apparatus of an optical information recording medium which records and/or reproduces digital information by using holography.

An optical information recording and reproduction apparatus 10 is connected to an external control apparatus 91 through an input and output control circuit 90. When recording is performed, the optical information recording and reproduction apparatus 10 receives an information signal to be recorded, from the external control apparatus 91 through the input and output control circuit 90. When reproduction is performed, the optical information recording and reproduction apparatus 10 transmits a reproduced information signal to the external control apparatus 91 through the input and output control circuit 90.

The optical information recording and reproduction apparatus 10 includes a pickup 11, a reproduction reference beam optical system 12, a curing optical system 13, a disc rotation angle detection optical system 14, and a rotation motor 50 and has a structure in which an optical information recording medium 1 is allowed to be rotated by the rotation motor 50.

The pickup 11 serves to emit a reference beam and a signal beam to the optical information recording medium 1 and to record digital information in the recording medium by using holography. At this time, an information signal to be recorded is transmitted into a spatial light modulator in the pickup 11 through a signal generation circuit 86 by a controller 89. The spatial light modulator modulates the signal beam.

When information recorded in the optical information recording medium 1 is reproduced, the reproduction reference beam optical system 12 generates a light wave for causing the reference beam which is emitted from the pickup 11 to be incident to the optical information recording medium in a direction reverse to a direction when recording is performed. Reproduction light which is reproduced by using a reproduction reference beam is detected by a photodetector in the pickup 11, which will be described later. The reproduction light is reproduced as a signal by a signal processing circuit 85.

When information is reproduced, an angle of the reference beam in a direction perpendicular to multiplexing is corrected by using a mirror with an actuator in the pickup 11, for example. A multiplexing perpendicular angle correction device control signal generation circuit 92 receives a signal input from the pickup 11, creates a control signal for correcting the angle of the reference beam in the direction perpendicular to multiplexing, and outputs the created control signal to a multiplexing perpendicular angle correction device driving circuit 93. The multiplexing perpendicular angle correction device driving circuit 93 receives the control signal input from the multiplexing perpendicular angle correction device control signal generation circuit 92 and drives the mirror with an actuator in the pickup 11, and thereby the angle of the reference beam in the direction perpendicular to multiplexing is corrected.

The controller 89 controls an open and close time of a shutter in the pickup 11 through a shutter control circuit 87 and thus an irradiation time for irradiating the optical information recording medium 1 with the reference beam and the signal beam may be adjusted.

The curing optical system 13 serves to generate optical beams used in pre-curing and post-curing of the optical information recording medium 1. The pre-curing means a pre-process of irradiating a predetermined position with a predetermined optical beam in advance before the predetermined position is irradiated with the reference beam and the signal beam, when information is recorded at the predetermined position in the optical information recording medium 1. The post-curing means a post-process of irradiating a predetermined position with a predetermined optical beam in order not to enable additional writing at the predetermined position, after information is recorded at the predetermined position in the optical information recording medium 1.

The disc rotation angle detection optical system 14 is used for detecting a rotation angle of the optical information recording medium 1. When the optical information recording medium 1 is adjusted to a predetermined rotation angle, the disc rotation angle detection optical system 14 may detect a signal in accordance with a rotation angle, the controller 89 may control the rotation angle of the optical information recording medium 1 through a disc rotation motor control circuit 88 by using the detected signal.

A predetermined beam source driving current is supplied to beam sources of the pickup 11, the curing optical system 13, and the disc rotation angle detection optical system 14 from a beam source driving circuit 82 and an optical beam having predetermined light intensity may be emitted from each of the beam sources.

The pickup 11 and the disc curing optical system 13 includes a mechanism which allows a position to slide in a radial direction of the optical information recording medium 1, and performs position control through an access control circuit 81.

A holographic recording technology using the principle of angle multiplexing has a tendency to set tolerance of shift of a reference beam angle to be very small.

Accordingly, the optical information recording and reproduction apparatus 10 is required to include a servo mechanism which includes a mechanism which detects an amount of shift of the reference beam angle provided in the pickup 11, causes a servo signal generation circuit 83 to generate a servo control signal, and causes the amount of shift to be corrected through a servo control circuit 84.

Simplification may be performed by combining some or all optical system configurations of the pickup 11, the curing optical system 13, and the disc rotation angle detection optical system 14.

Figure 2:
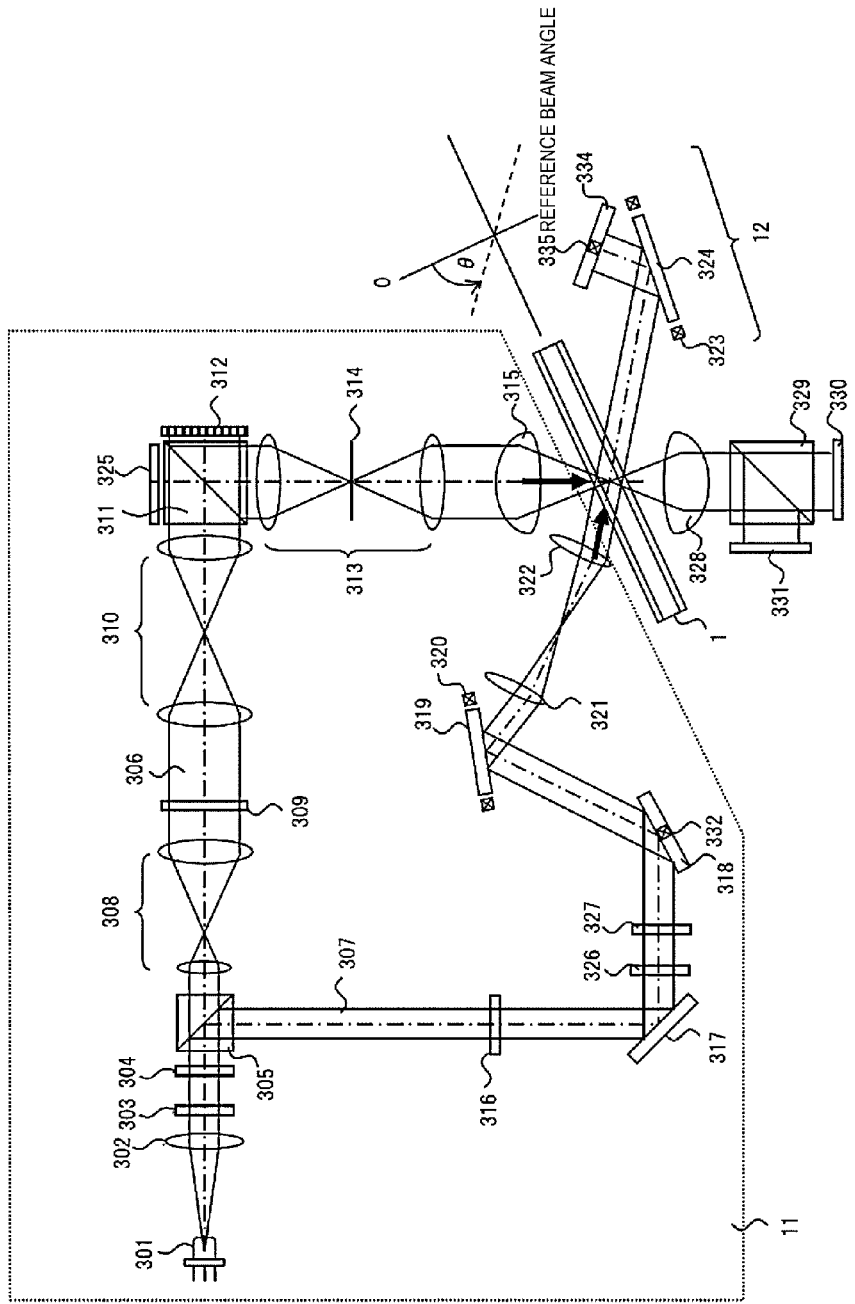
FIG. 2 is a schematic diagram illustrating an embodiment of a pickup in the optical information recording and reproduction apparatus.

FIG. 2 is a diagram illustrating a recording principle in an example of a basic optical system configuration of the pickup 11 in the optical information recording and reproduction apparatus 10. An optical beam which is emitted from a beam source 301 passes through a collimate lens 302 and is incident to a shutter 303. When the shutter 303 opens, the optical beam passes through the shutter 303, and then a polarization direction of the optical beam is controlled such that, for example, an optical element 304 which is configured by, for example, a ½ wavelength plate and the like causes a light intensity ratio of p-polarized light and s-polarized light to be a predetermined ratio. Then, the optical beam is incident to a polarization beam splitter (PBS) prism 305.

The optical beam which passes through the PBS prism 305 serves as a signal beam 306. A beam expander 308 causes the diameter of the optical beam to become wider and then the optical beam passes through a phase mask 309, a relay lens 310, and a PBS prism 311. Then, the optical beam is incident to a spatial light modulator 312.

The signal beam obtained by the spatial light modulator 312 adding information is reflected by the PBS prism 311 and is transmitted to a relay lens 313 and a spatial filter 314. Then, the signal beam is condensed at the optical information recording medium 1 by an objective lens 315.

The optical beam which is reflected by the PBS prism 305 serves as a reference beam 307. A polarization direction conversion element 316 sets a direction of the reference beam 307 to be a predetermined polarization direction in accordance with a time of recording or a time of reproduction. Then, the reference beam 307 is incident on a galvano mirror 319 through a mirror 317 and a mirror 318. At this time, when reproduction is performed, the polarization direction is finely changed by a wavelength plate 326 and thus a servo beam component other than a normal reproduction beam component is generated. In FIG. 2, the p-polarized light corresponds to the reproduction beam component and the s-polarized light corresponds to the servo beam component. Then, for example, a polarization splitting element 327 such as a Wollaston prism splits angles of the p-polarized light and the s-polarized light in the multiplexing direction by a desired angle. When recording is performed, an angle of the wavelength plate 326 is set so as not to have an influence on change of the polarization direction. An angle of the mirror 318 is changed in a direction perpendicular to multiplexing by, for example, an actuator 332, and thus an angle of the reference beam in the direction perpendicular to multiplexing is corrected when reproduction is performed. Since the galvano mirror 319 allows an angle to be adjusted by using an actuator 320, an incident angle of the reference beam which passes through a lens 321 and a lens 322 and then is incident to the optical information recording medium 1 may be set to a desired angle. In order to set the incident angle of the reference beam, an element of converting a wavefront of the reference beam may be used instead of the galvano mirror. In this specification, as illustrated for example, a direction perpendicular to the optical information recording medium is defined as 0 degrees for the reference beam angle, a direction in which a scanning range of the reference beam angle is large is defined as a positive direction and the reverse direction is defined as a negative direction in a plane in which at least two reference beams or more having angles changed by the actuator 320 exist.

In this manner, the signal beam and the reference beam are incident to overlap each other in the optical information recording medium 1, and thereby an interference fringe pattern is formed in the recording medium. Information is recorded by writing this pattern in the recording medium. Since the incident angle of the reference beam which is to be incident to the optical information recording medium 1 may be changed by the galvano mirror 319, recording by angle multiplexing is enabled.

Hereinafter, a hologram corresponding to one reference beam angle is referred to as a page among holograms obtained by performing recording with changing of the reference beam angle in the same area, and a set of pages obtained by performing angle multiplexing in the same area is referred to as a book.

Figure 3:
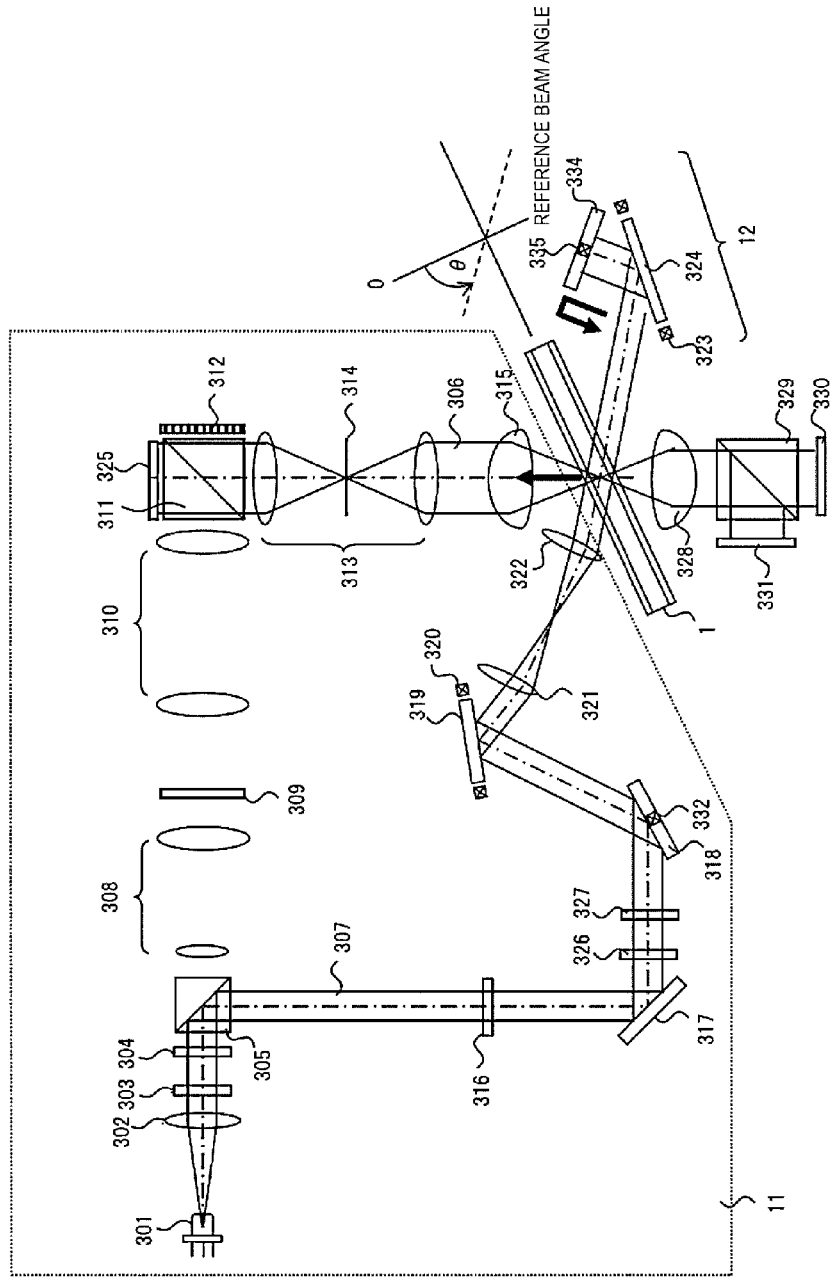
FIG. 3 is a schematic diagram illustrating an embodiment of the pickup in the optical information recording and reproduction apparatus.

FIG. 3 illustrates a reproduction principle in an example of a basic optical system configuration of the pickup 11 in the optical information recording and reproduction apparatus 10. When recorded information is reproduced, as described above, the reference beam is incident to the optical information recording medium 1, an optical beam which passes through the optical information recording medium 1 is reflected by a galvano mirror 324 which enables adjustment of angle by using an actuator 323, and a galvano mirror 334 which enables adjustment of angle by using an actuator 335. Thus, a reproduction reference beam is generated. Here, for example, the galvano mirror 324 enables a mirror angle to be adjusted in the multiplexing direction and adjusts an angle of the reference beam in the multiplexing direction such that the reference beam is vertically incident on the galvano mirror 334 all the time. For example, the galvano mirror 334 enables a mirror angle to be adjusted in the direction perpendicular to the multiplexing direction and adjusts the angle of the reference beam in the direction perpendicular to multiplexing such that the angle of the reference beam is vertically reflected all the time. At this time, light reproduced on a lower side by applying the reference beam from an upper surface of a disc before reflection on the galvano mirror 324 is used for a control signal which is for controlling the angle of the reference beam in the direction perpendicular to multiplexing. The light which is reproduced on the lower side is caused to be collimated light by a lens 328 and is divided into p-polarized light and s-polarized light by a PBS prism 329. The p-polarized light and s-polarized light are detected by a photodetector 330 and a photodetector 331. The s-polarized light and the p-polarized light which are incident from the upper surface of the disc are applied in a state where the s-polarized light and the p-polarized light are intentionally shifted in directions reverse to each other from an optimal angle for reproducing a hologram. When being reflected by the galvano mirror 324, angles of the s-polarized light and the p-polarized light are changed so as to be the optimal angle for reproducing a hologram. Convergent light may be used instead of collimated light, be defocused, and be received by the photodetector in order to cause the photodetector to have a small size.

Reproduction light which is reproduced by the reproduction reference beam is transmitted to the objective lens 315, the relay lens 313, and the spatial filter 314. Then, the reproduction light passes through the PBS prism 311 and is incident to a photodetector 325, and thus a recorded signal can be reproduced. As the photodetector 325, an imaging device such as a CMOS imaging sensor or a CCD imaging sensor may be used. However, any element may be used as long as the element enables reproduction of page data.

Figure 4:
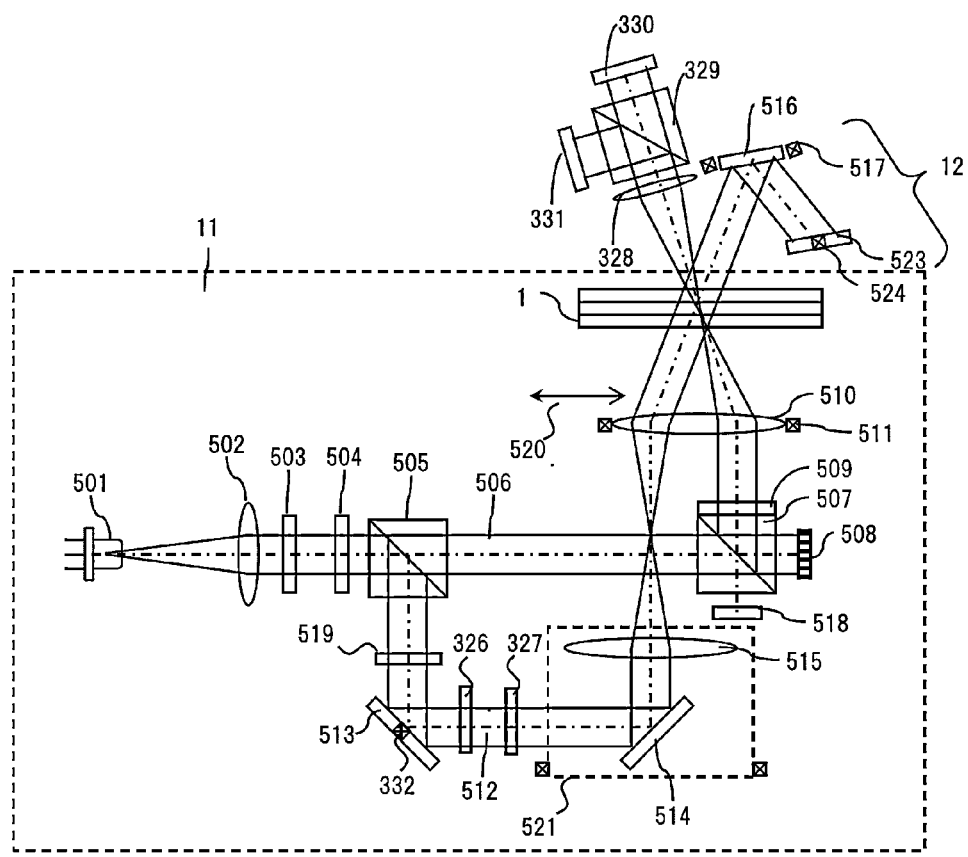
FIG. 4 is a schematic diagram illustrating an embodiment of the pickup in the optical information recording and reproduction apparatus.

FIG. 4 is a diagram illustrating the other configuration of the pickup 11. In FIG. 4, an optical beam which is emitted from a beam source 501 passes through a collimate lens 502 and is incident to a shutter 503. When the shutter 503 opens, the optical beam passes through the shutter 503 and then a polarization direction of the optical beam is controlled such that, for example, an optical element 504 which is configured by, for example, a ½ wavelength plate and the like causes a light intensity ratio of p-polarized light and s-polarized light to be a predetermined ratio. Then, the optical beam is incident to a PBS prism 505.

The optical beam which passes through the PBS prism 505 is incident to a spatial light modulator 508 through a PBS prism 507. A signal beam 506 obtained by the spatial light modulator 508 adding information is reflected by the PBS prism 507 and is transmitted to an angle filter 509 for causing only an optical beam having a predetermined incident angle to pass through. Then, the signal light beam is condensed at the hologram recording medium 1 by an objective lens 510.

The optical beam which is reflected by the PBS prism 505 serves as a reference beam 512. The optical beam is set to have a predetermined polarization direction in accordance with a time of recording or a time of reproduction by a polarization direction conversion element 519. Then, the optical beam is incident to a lens 515 through a mirror 513 and a mirror 514. The lens 515 serves to condense reference beams 512 on a back focus plane of the objective lens 510. The reference beams which are condensed on the back focus plane of the objective lens 510 are caused to be collimated light again by the objective lens 510 and are incident to the hologram recording medium 1. At this time, when reproduction is performed, the polarization direction is finely changed by the wavelength plate 326 and thus a servo beam component other than a normal reproduction beam component is generated. In FIG. 4, the p-polarized light corresponds to the reproduction beam component and the s-polarized light corresponds to the servo beam component. Then, for example, the polarization splitting element 327 such as a Wollaston prism splits angles of the p-polarized light and the s-polarized light in the multiplexing direction by a desired angle. When recording is performed, an angle of the wavelength plate 326 is set so as not to have an influence on change of the polarization direction. An angle of a mirror 513 is changed in the direction perpendicular to multiplexing by, for example, the actuator 332, and thus an angle of the reference beam in the direction perpendicular to multiplexing is corrected when reproduction is performed.

Here, the objective lens 510 or an optical block 521 is allowed to drive in a direction indicated by a reference numeral of 520, for example. A relative positional relationship of a position of the objective lens 510 and a position of a light condensing spot of the objective lens 510 in the back focus plane is changed by shifting a position of the objective lens 510 or the optical block 521 along a driving direction 520. Thus, it is possible to set the incident angle of the reference beam which is to be incident to the hologram recording medium 1, to be a desired angle. The incident angle of the reference beam may be set to be a desired angle by an actuator driving a mirror 514 instead of driving of the objective lens 510 or the optical block 521.

In this manner, the signal beam and the reference beam are incident to the hologram recording medium 1 so as to overlap each other, and thus an interference fringe pattern is formed in the recording medium, and information is recorded by writing this pattern in the recording medium. The incident angle of the reference beam which is incident to the hologram recording medium 1 can be changed by shifting the position of the objective lens 510 or the position of the optical block 521 along the driving direction 520. Thus, recording by angle multiplexing is enabled.

When recorded information is reproduced, as described above, the reference beam is incident to the hologram recording medium 1, and an optical beam which passes through the hologram recording medium 1 is reflected by a galvano mirror 516 and a galvano mirror 523. Thus, a reproduction reference beam is generated. Here, for example, the galvano mirror 516 enables a mirror angle to be adjusted in the multiplexing direction and adjusts an angle of the reference beam in the multiplexing direction such that the reference beam is vertically incident on the galvano mirror 523 all the time. For example, the galvano mirror 523 enables a mirror angle to be adjusted in the direction perpendicular to multiplexing and adjusts an angle of the reference beam in the direction perpendicular to multiplexing such that the reference beam is vertically reflected all the time. At this time, light reproduced on an upper side by applying the reference beam from a lower surface of a disc before reflection on the galvano mirror 516 is used for a control signal which is for controlling the angle of the reference beam in the direction perpendicular to multiplexing. The light which is reproduced on the upper side is caused to be collimated light by the lens 328 and is divided into p-polarized light and s-polarized light by the PBS prism 329. The p-polarized light and the s-polarized light are detected by the photodetector 330 and the photodetector 331. The s-polarized light and the p-polarized light which are incident from the lower surface of the disc are applied in a state where the s-polarized light and the p-polarized light are intentionally shifted in directions reverse to each other from an optimal angle for reproducing a hologram. When being reflected by the galvano mirror 516, angles of the s-polarized light and the p-polarized light are changed so as to be the optimal angle for reproducing a hologram. Convergent light may be used instead of collimated light, be defocused, and be received by the photodetector in order to cause the photodetector to have a small size. Reproduction light which is reproduced by the reproduction reference beam is transmitted to the objective lens 510 and the angle filter 509. Then, the reproduction light passes through the PBS prism 507 and is incident to the photodetector 518, and thus a recorded signal may be reproduced.

The optical system illustrated in FIG. 4 has a configuration in which the signal beam and the reference beam are incident to the same objective lens and thus has an advantage of enabling large reduction in size of the optical system, compared to the optical system configuration illustrated in FIG. 2.

Figure 5:
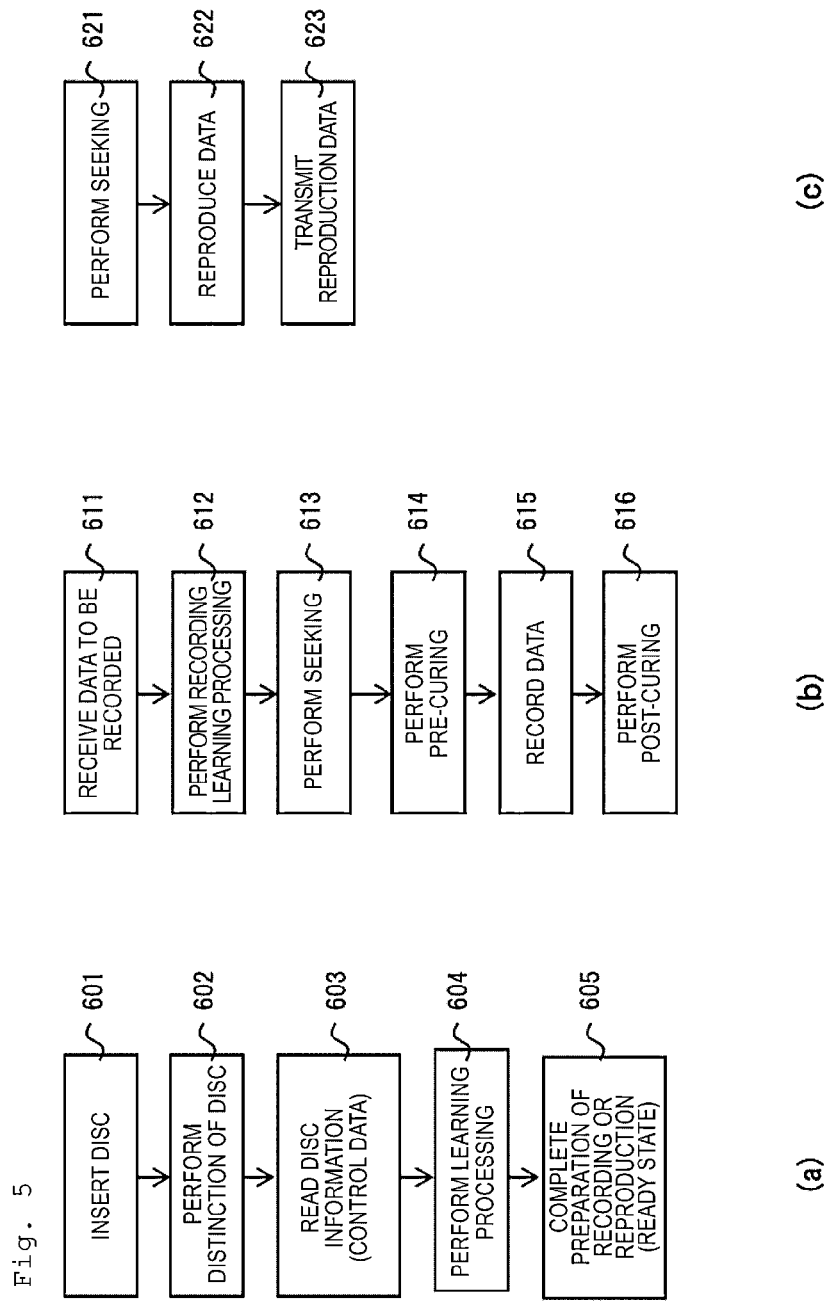
FIG. 5 is a schematic diagram illustrating an embodiment of an operation flow of the optical information recording and reproduction apparatus.

FIG. 5 illustrates operation flows of recording and reproduction performed in the optical information recording and reproduction apparatus 10. Here, particularly, a flow relating to recording and reproduction using holography will be described.

FIG. 5(a) illustrates an operation flow until preparation for recording or reproduction is completed after the optical information recording medium 1 is inserted into the optical information recording and reproduction apparatus 10. FIG. 5(b) illustrates an operation flow from a preparation completion state until information is recorded in the optical information recording medium 1. FIG. 5(c) illustrates an operation flow from the preparation completion state until information recorded in the optical information recording medium 1 is reproduced.

As illustrated in FIG. 5(a), when a medium is inserted as illustrated (601), the optical information recording and reproduction apparatus 10 performs disc distinction of determining whether or not the inserted medium is a medium for recording or reproducing digital information by using holography (602).

When it is determined to be an optical information recording medium for recording or reproducing digital information by using holography as a result of the disc distinction, the optical information recording and reproduction apparatus 10 reads control data which is provided in the optical information recording medium (603) and obtains information regarding, for example, the optical information recording medium or information regarding, for example, various setting conditions used when recording or reproduction is performed.

After the control data is read, various types of adjustment or a learning process (604) relating to the pickup 11 is performed in accordance with the control data, and the optical information recording and reproduction apparatus 10 completes preparation of recording or reproduction (605).

As illustrated in FIG. 5(b), in the operation flow from the preparation completion state until information is recorded, first, data to be recorded is received (611) and information corresponding to the received data is sent to the spatial light modulator in the pickup 11.

Then, various recording learning processes of, for example, power optimization of the beam source 301, optimization of an exposure time by the shutter 303, and the like are performed as necessary beforehand such that high quality information can be recorded in the optical information recording medium (612).

Then, in a seeking operation (613), the pickup 11 and the curing optical system 13 are positioned at positions corresponding to a predetermined position of the optical information recording medium by controlling the access control circuit 81. When address information is included in the optical information recording medium 1, the address information is reproduced. It is confirmed whether or not the pickup 11 and the curing optical system 13 are positioned at target positions. When the pickup 11 and the curing optical system 13 are not disposed at the target positions, an amount of shift to the predetermined position is calculated and an operation of positioning is performed again.

Then, a predetermined area is subjected to pre-curing by using an optical beam which is emitted from the curing optical system 13 (614), and data is recorded by using the reference beam and the signal beam which are emitted from the pickup 11 (615).

After the data is recorded, post-curing is performed by using an optical beam which is emitted from the curing optical system 13 (616). The data may be verified as necessary.

As illustrated in FIG. 5(c), in the operation flow from the preparation completion state until recorded information is reproduced, first in a seeking operation (621), the pickup 11 and the reproduction reference beam optical system 12 are positioned at positions corresponding to a predetermined position of the optical information recording medium by controlling the access control circuit 81. When address information is included in the optical information recording medium 1, the address information is reproduced, and it is confirmed whether or not the pickup 11 and the reproduction reference beam optical system 12 are positioned at target positions. When the pickup 11 and the reproduction reference beam optical system 12 are not disposed at the target positions, an amount of shift to the predetermined position is calculated and an operation of positioning is performed again.

Then, the reference beam is emitted from the pickup 11 and information which is recorded in the optical information recording medium is read (622), and reproduction data is transmitted (613).

Figure 8:
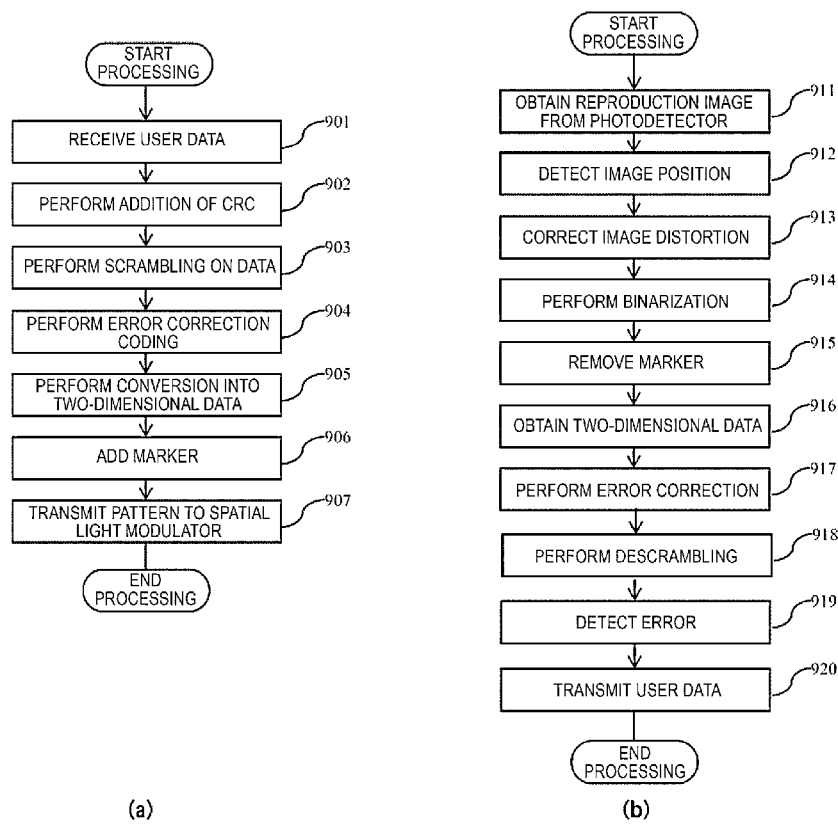
FIG. 8 is a schematic diagram illustrating an embodiment of operation flows of the signal generation circuit and the signal processing circuit.

FIG. 8 illustrates data processing flows when recording and reproduction are performed. FIG. 8(a) illustrates a data recording processing flow from after the input and output control circuit 90 receives data to be recorded (611) until the received data is converted into two-dimensional data on the spatial light modulator 312, which is performed by the signal generation circuit 86. FIG. 8(b) illustrates a reproduction data processing flow from after two-dimensional data is detected by the photodetector 325 until reproduction data is transmitted in the input and output control circuit 90 (624), which is performed by the signal processing circuit 85.

Data processing when recording is performed will be described using FIG. 8(a). When user data is received (901), the user data is divided into a plurality of data sequences and each of the data sequences is caused to be a data sequence of enabling CRC (902) such that error detection is performed when reproduction is performed. Scrambling of adding a pseudo random number data sequence to a data sequence is performed (903) such that the number of on-pixels and the number of off-pixels are substantially equal and repetition of the same pattern is prevented. Then, error correction coding such as a Reed-Solomon code is performed (904) such that error correction is performed when reproduction is performed. Next, this data sequence is converted into M×N two-dimensional data and conversion is repeated for data of one page. Thus, two-dimensional data for one page is configured (905). A marker which is a reference in image position detection or image distortion correction when reproduction is performed is added to the two-dimensional data which is configured in this manner (906). The data is transmitted to the spatial light modulator 312 (907).

Next, a data processing flow when reproduction is performed will be described using FIG. 8(b). Image data which is detected by the photodetector 325 is transmitted to the signal processing circuit 85 (911). An image position is detected by using a marker included in the image data as a reference (912) and distortion such as tilt, magnification, distortion, and the like of an image is corrected (913). Then, binarization processing (914) is performed and two-dimensional data for one page is obtained (916) by removing the marker (915). The two-dimensional data which is obtained in this manner is converted into a plurality of data sequences, and then error correction processing (917) is performed and a parity data sequence is removed. Then, descrambling processing (918) is performed and error detection processing (919) by the CRC is performed. After CRC parity is removed, user data is transmitted through the input and output control circuit 90 (920).

Figure 6:
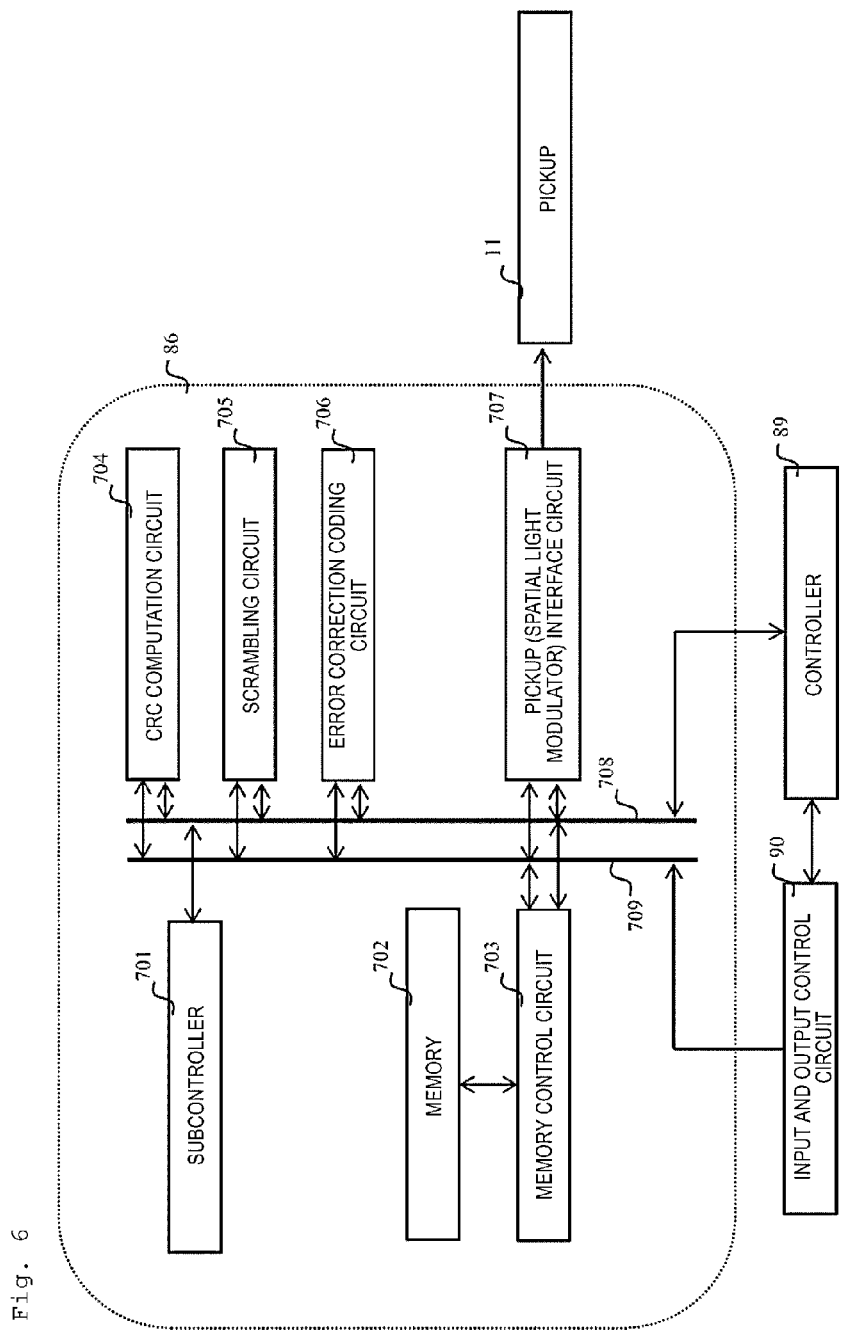
FIG. 6 is a schematic diagram illustrating an embodiment of a signal generation circuit in the optical information recording and reproduction apparatus.

FIG. 6 is a block diagram of the signal generation circuit 86 in the optical information recording and reproduction apparatus 10.

When an input of user data to the input and output control circuit 90 is started, the input and output control circuit 90 notifies the controller 89 that an input of the user data is started. The controller 89 receives this notification and commands the signal generation circuit 86 to perform a recording process on data for one page which is input from the input and output control circuit 90. A subcontroller 701 in the signal generation circuit 86 is notified of a processing command from the controller 89 through a control line 708. The subcontroller 701 receives this notification and performs control of signal processing circuits through the control line 708 such that each of the signal processing circuits is operated in parallel. First, the subcontroller 701 controls a memory control circuit 703 to store user data which is input from the input and output control circuit 90, in a memory 702 through a data line 709. If an amount of the user data stored in the memory 702 reaches a certain constant amount, the subcontroller 701 controls a CRC computation circuit 704 to cause the user data to be data of enabling CRC. Then, control of scrambling in which a scrambling circuit 705 adds a pseudo random number data sequence to the data of enabling CRC is performed and control of error correction coding in which an error correction coding circuit 706 adds a parity data sequence to the data of enabling CRC is performed. Finally, data subjected to error correction coding is read from the memory 702 to a pickup interface circuit 707 in an order of a line in two-dimensional data on the spatial light modulator 312 and a marker which is a reference when reproduction is performed is added. Then, the two-dimensional data is transmitted to the spatial light modulator 312 in the pickup 11.

Figure 7:
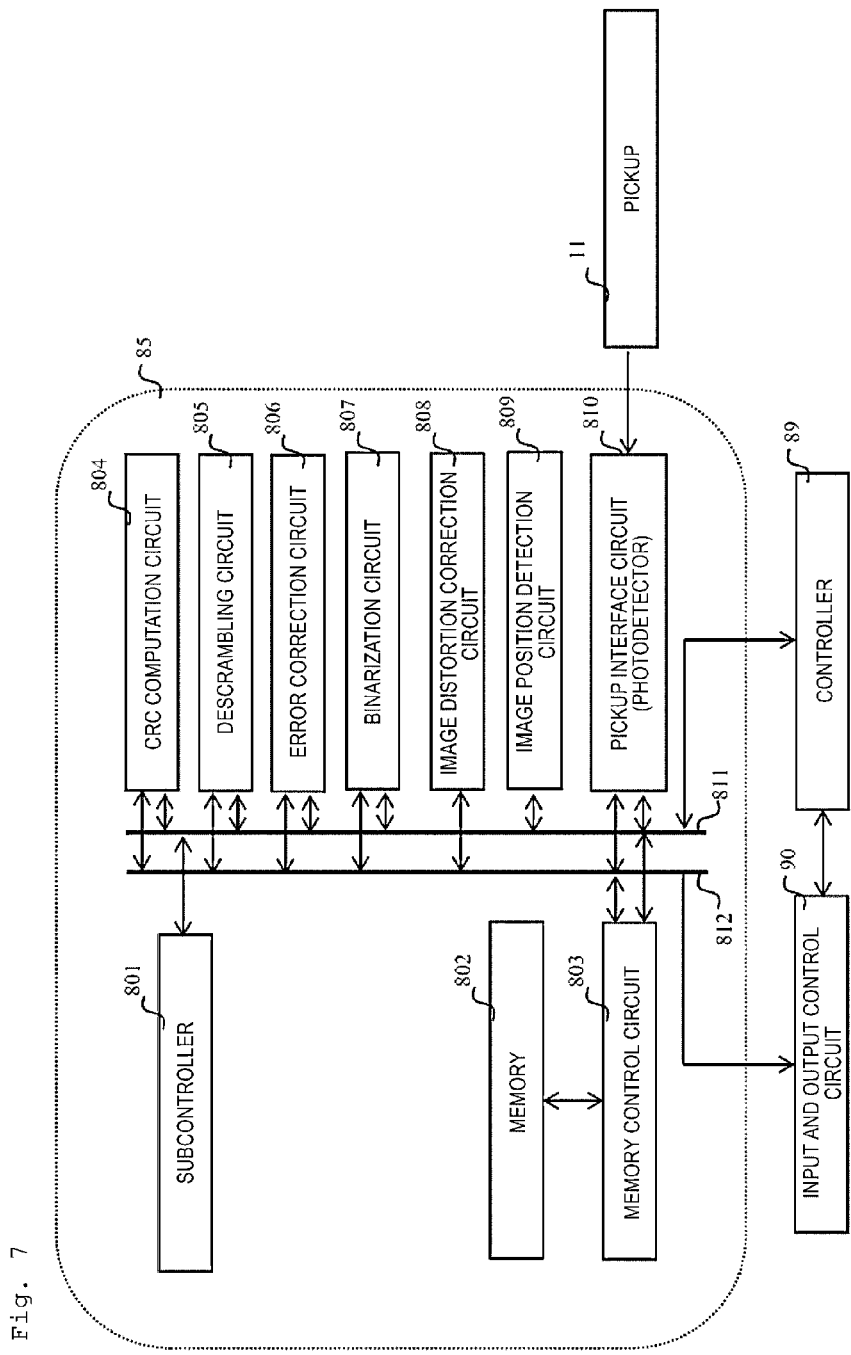
FIG. 7 is a schematic diagram illustrating an embodiment of a signal processing circuit in the optical information recording and reproduction apparatus.

FIG. 7 is a block diagram of the signal processing circuit 85 in the optical information recording and reproduction apparatus 10.

When the photodetector 325 in the pickup 11 detects image data, the controller 89 commands the signal processing circuit 85 to perform reproduction processing on data for one page which is input from the pickup 11. A subcontroller 801 in the signal processing circuit 85 is notified of a processing command from the controller 89 through a control line 811. The subcontroller 801 receives this notification and performs control of signal processing circuits through the control line 811 such that each of the signal processing circuits is operated in parallel. First, the subcontroller 801 controls a memory control circuit 803 to store image data which is input from the pickup 11 through a pickup interface circuit 810, in a memory 802 through a data line 812. If an amount of the data stored in the memory 802 reaches a certain constant amount, the subcontroller 801 controls an image position detection circuit 809 to detect a marker in the image data which is stored in the memory 802 and to extract an effective data range. Then, the subcontroller 801 controls an image distortion correction circuit 808 to correct distortion such as tilt, magnification, distortion, and the like of an image by using the detected marker and control of converting the image data so as to have the size of expected two-dimensional data is performed. The subcontroller 801 performs control of binarization in which bit data of each of multiple bits constituting the size-converted two-dimensional data is determined to be "0" or "1", in a binarization circuit 807 and control of storing data in the memory 802 in an order of an output of reproduction data. Then, an error correction circuit 806 corrects an error which is included in a data sequence and a descrambling circuit 805 performs descrambling by adding the pseudo random number data sequence. Then, a CRC computation circuit 804 confirms that an error is not included in user data stored in the memory 802. Thereafter, the user data is transmitted to the input and output control circuit 90 from the memory 802.

Figure 9:
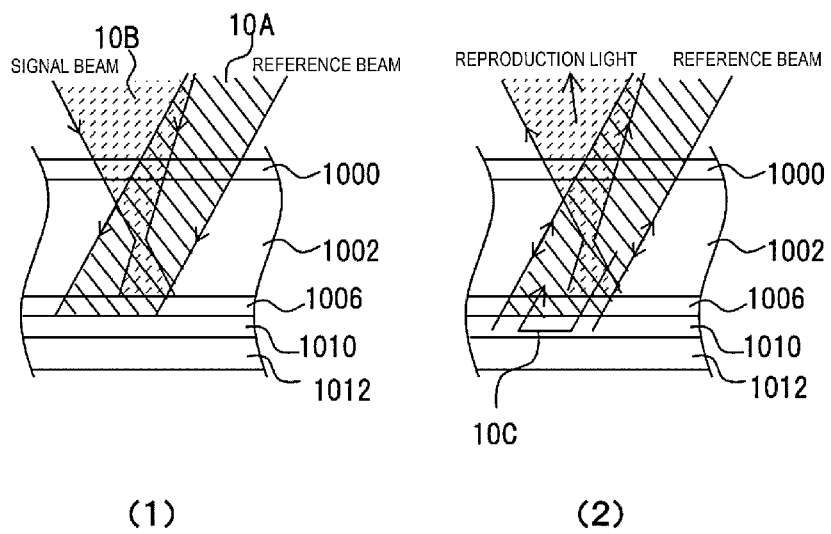
FIG. 9 is a schematic diagram illustrating an embodiment of a layer structure of an optical information recording medium having a reflective layer.

FIG. 9 is a diagram illustrating a layer structure of an optical information recording medium which has a reflective layer. (1) illustrates a state where information is recorded in the optical information recording medium. (2) illustrates a state where information from the optical information recording medium is reproduced.

The optical information recording medium 1 includes a transparent cover layer 1000, a recording layer 1002, a light absorbing/light transmitting layer 1006, an optical reflective layer 1010, and a third transparent protective layer 1012 from the optical pickup 11 side. An interference pattern of a reference beam 10A and a signal beam 10B is recorded in the recording layer 1002.

The light absorbing/light transmitting layer 1006 has converted physical properties so as to absorb the reference beam 10A and the signal beam 10B when information is recorded and to cause the reference beam to pass through when information is reproduced. For example, a colored state or a decolored state of the light absorbing/light transmitting layer 1006 is switched by applying a voltage to an optical recording medium 1. That is, when information is recorded, the light absorbing/light transmitting layer 1006 becomes the colored state and absorbs the reference beam 10A and the signal beam 10B which pass through the recording layer 1002. When information is reproduced, the light absorbing/light transmitting layer 1006 becomes the decolored state and causes the reference beam to pass through (T. Ando et. al.: Technical Digest ISOM (2006), Th-PP-10). The reference beam 10A which passes through the light absorbing/light transmitting layer 1006 is reflected by the optical reflective layer 1010 and becomes a reproduction reference beam 10C.

$WO_3$ as an electrochromic (EC) material which is disclosed in Technical Digest (A. Hirotsune et. al., ISOM (2006), Mo-B-04) may be used in the light absorbing/light transmitting layer 1006.

Coloring or decoloring is caused to reversibly occur by applying a voltage to this material, and thus when information is recorded, this material becomes colored so as to absorb light and when information is reproduced, this material becomes decolored so as to cause light to pass through.

The structure in FIG. 9 causes the reproduction reference beam optical system to be unnecessary and reduction of the size of a driving component is enabled.

Figure 10:
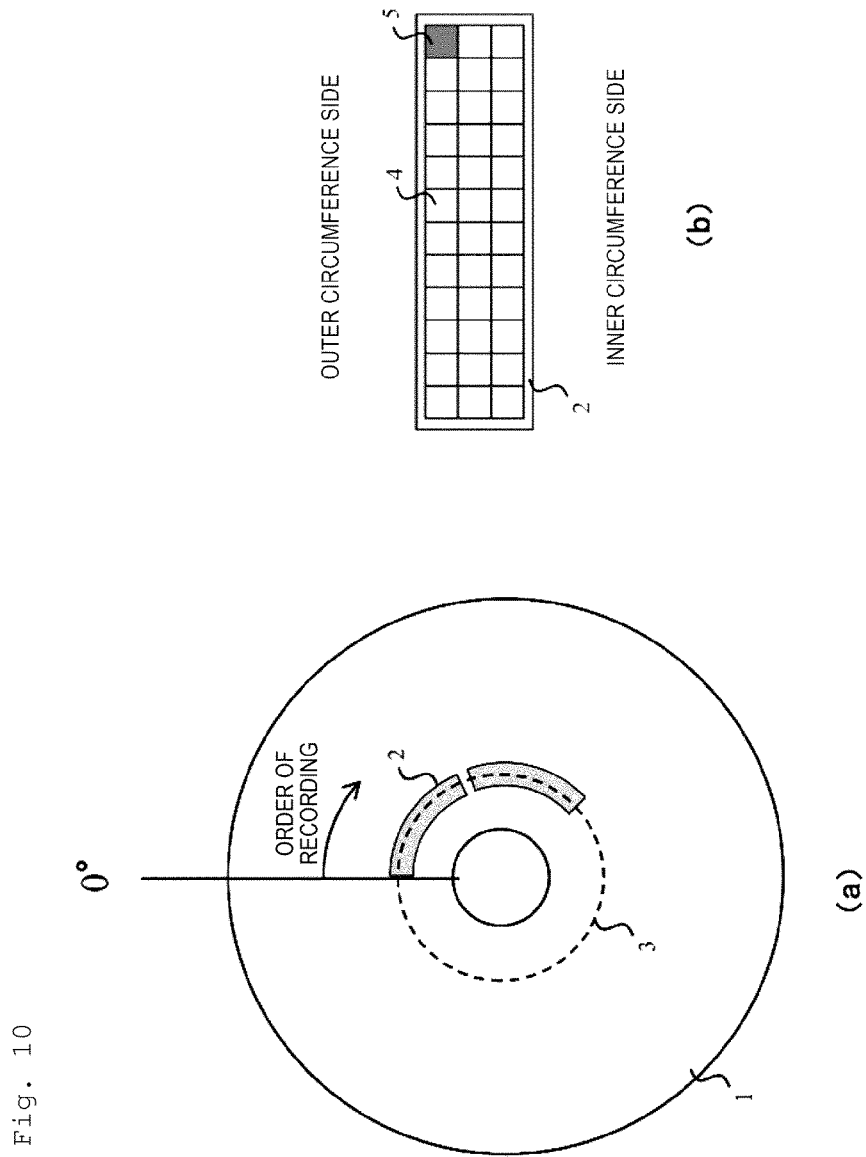
FIG. 10 is a schematic diagram illustrating an embodiment of an optical information recording medium and a bookcase.

FIG. 10 indicates a schematic diagram illustrating an embodiment of an optical information recording medium and a bookcase.

FIG. 10(a) indicates a schematic diagram illustrating the embodiment of the optical information recording medium. For example, a concentric track 3 is disposed at the center of the optical information recording medium 1 and a bookcase 2 is recorded on this track. The bookcase means the smallest unit which is able to be recorded during a recording session and is configured by a plurality of books. For example, bookcases are disposed to have a gap between the bookcases, as illustrated in FIG. 10(a). When data is recorded in the optical information recording medium, for example, a bookcase is recorded clockwise from a track on an inner circumference side. When a bookcase is recorded in the track for the first time, for example, a rotation angle position of the optical information recording medium is unified and recording is performed. FIG. 10(a) illustrates a recording start position of a track which is indicated by a straight line of 0°.

FIG. 10(b) indicates a schematic diagram illustrating an embodiment of the bookcase. The bookcase 2 is configured by a plurality of books 4 and a management area 5, for example. For example, so-called management information is recorded in the management area and the management information includes information regarding an optical information recording medium, information regarding an optical information recording and reproduction apparatus which performs recording or reproduction, various setting conditions for recording or reproduction, environment information of temperature, humidity, date and time, and the like at the time of recording or reproduction, information regarding a physical address or a logical address, information of a medium format, information on a defect position, information on replacement area, and the like. The management area is not used in recording of user data. This management area is disposed, for example, at a right end portion on the outermost circumference side in a bookcase. When a reproduction operation is performed, for example, this management area is searched for and reproduced at first.

A search method in the management area will be described. Since the management area is recorded at an end portion of a bookcase, as described above, a boundary between a recording completion area and a not-recorded area may be searched for.

Figure 11:
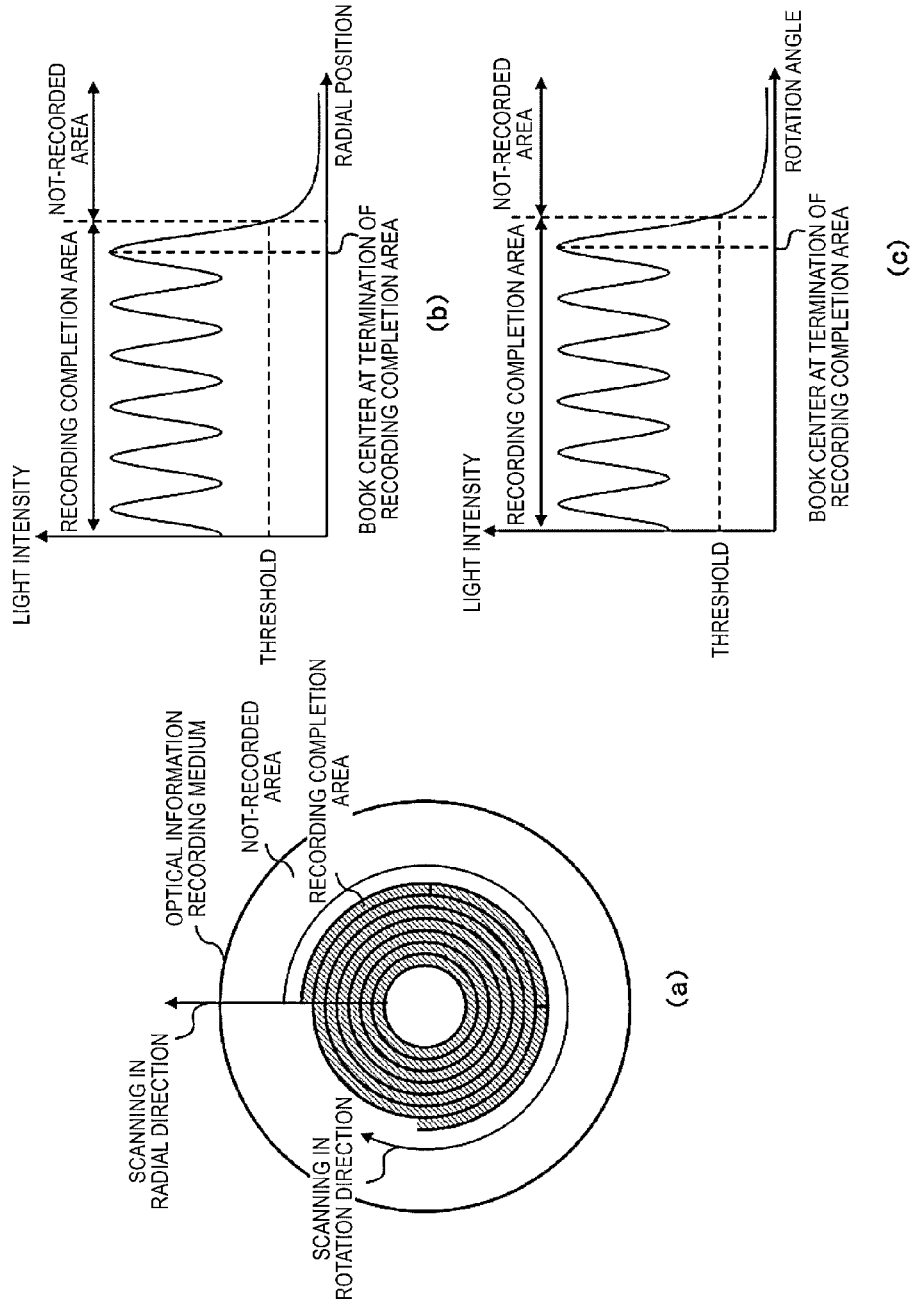
FIG. 11 is a schematic diagram illustrating an example of a relationship of sections of a recording completion area and a not-recorded area, and light intensity which is detected when scanning is performed.

FIG. 11 indicates a schematic diagram illustrating an example of a relationship of sections of the recording completion area and the not-recorded area, and light intensity which is detected when scanning is performed.

FIG. 11 (a) illustrates the recording completion area and the not-recorded area in an optical information recording medium. The concentric recording completion area is disposed to be directed to an outer circumference of the optical information recording medium from an inner circumference and the outermost circumference of the recording completion area indicates that recording is ended on the way of a rotation angle.

FIG. 11(b) illustrates the light intensity obtained when light intensity is scanned in a radial direction after a reference beam angle is shifted in a direction perpendicular to angle multiplexing, and the outermost circumference of the recording completion area is determined. When the recording completion area is scanned, light intensity which is larger than threshold is detected all the time, and a peak of the light intensity is obtained each time scanning passes through a book. When scanning passes over the outermost circumference of the recording completion area, light intensity is equal to or less than the threshold. Thus, the light intensity is detected and it is determined that a position of a peak of the last light intensity is at the outermost circumference of the recording completion area.

FIG. 11(c) illustrates light intensity obtained when light intensity is scanned in a rotation direction and a termination of the recording completion area is determined. When the recording completion area is scanned, light intensity which is larger than threshold is detected all the time and a peak of the light intensity is obtained each time scanning passes through a book. When scanning passes over the outermost circumference of the recording completion area, light intensity is equal to or less than the threshold. Thus, the light intensity is detected and it is determined that a position of a peak of the last light intensity corresponds to the termination of the recording completion area.

According to the above descriptions, it is possible to stably detect the boundary between the recording completion area and the not-recorded area, by shifting the reference beam angle in the direction perpendicular to angle multiplexing and scanning light intensity and the management area may be searched for.

FIG. 12 indicates a schematic diagram illustrating an example of a book recording order in a bookcase in the optical information recording and reproduction apparatus. For example, when a book is recorded, recording is performed for each track indicated by Tr1 or Tr2. If recording in a certain track is ended, moving to the next track is performed and recording is performed. Regarding the track, for example, first recording is performed in the odd-numbered track which is indicated by Tr1 and subsequent recording is performed in the even-numbered track which is indicated by Tr2. This is for that a recording portion of the optical information recording medium has a tendency to be contracted by recording, and thus contraction states in neighboring tracks are caused to be uniform and recording is performed. That is, recording in Tr1 and then Tr2 allows recording to be commonly performed in neighboring tracks on an inner circumference side and on an outer circumference side in a not-contracted state when recording is performed in Tr1 and allows recording to be commonly performed in the neighboring tracks on the inner circumference side and on the outer circumference side in a contracted state when recording is performed in Tr2. This technology is referred to as skip sorting, for example. When a book in a track is recorded, for example, a book which is indicated by L1 is recorded and then a book which is indicated by L2 is recorded because of the same reason. L1 is referred to as, for example, Layer 1 and L2 is referred to as, for example, Layer 2. This technology is referred to as, for example, layer recording.

FIG. 13 indicates a schematic diagram illustrating an embodiment of the photodetector in the optical information recording and reproduction apparatus. The photodetector 330 or 331 is divided into, for example, two equal parts in the direction perpendicular to multiplexing and light reception signals in the parts are respectively set as A, B, C, and D. At this time, an error signal in the direction perpendicular to multiplexing of the reference beam is represented by, for example, the following expression.

$$\text{Multiplexing perpendicular direction angular error signal} = (A-B)/(A+B) - (C-D)/(C+D) \quad \text{(Expression 1)}$$

The number and disposition of divided parts of the light receiving surface in the photodetector are not limited to FIG. 13 and the number of divided parts may be two or more. In this case, a multiplexing perpendicular direction angular error signal may be generated by obtaining the luminescent center of a signal on the light receiving surface.

Figure 14:
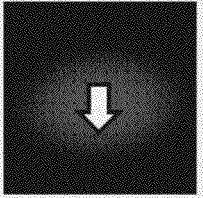
FIG. 14 is a diagram illustrating an example of a simulation result of a reproduction page when an angle of a reference beam in a multiplexing perpendicular direction is shifted and an angle of the reference beam in the multiplexing direction is shifted.

FIG. 14 indicates a diagram illustrating an example of a simulation result of a reproduction page when an angle of the reference beam is shifted in a multiplexing perpendicular direction and the angle of the reference beam is shifted in the multiplexing direction. When an amount of angle shift in the multiplexing direction exists, the luminescent center of the reproduction page has vertical displacement (direction perpendicular to multiplexing) by generating angle shift in the multiplexing perpendicular direction. Since a displacement direction of the luminescent center of the reproduction page is reversed by a direction in which an offset of angle shift in the multiplexing direction is added, a difference between a center position when the offset is added in a negative direction, and a center position when the offset is added in a positive direction is calculated and thus an angular error signal in the multiplexing perpendicular direction may be generated.

Figure 15:
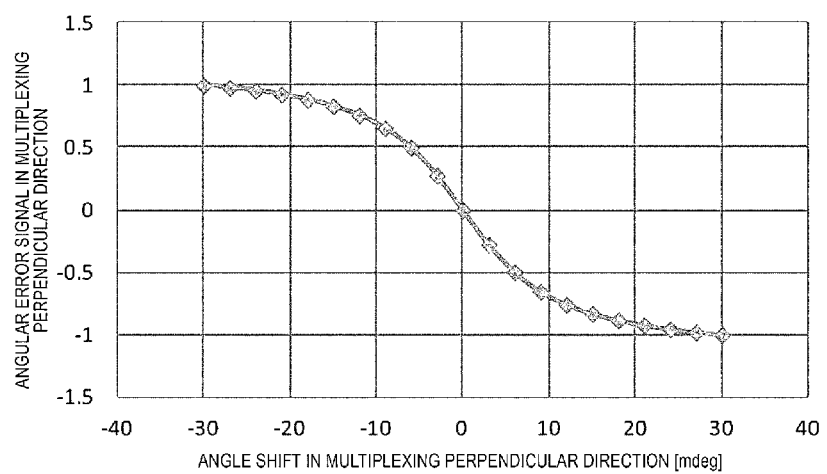
FIG. 15 is a diagram illustrating a simulation result of a reference beam multiplexing perpendicular direction angular error signal.

FIG. 15 indicates a diagram illustrating a simulation result of a reference beam multiplexing perpendicular direction angular error signal. This result means a result obtained by creating an error signal through simulation by using Expression 1. The error signal becomes an S-shaped signal varying depending on the amount of angle shift in the direction perpendicular to multiplexing and it is understood that the error signal may be created by the invention.

FIG. 16 indicates a diagram illustrating an embodiment of a learning operation flow for photodetector installation error amount. As illustrated in FIG. 14, when reference beam angle shift is not generated, even though angle shift in the multiplexing direction is generated, the position of the luminescent center of the reproduction page is not changed. An installation error of the photodetector is learned by using this property. First, a reference beam angle is positioned so as to cause an SNR to be the maximum, in 601. Here, positioning of the reference beam angle is performed in such a manner that a page is reproduced while, for example, the reference beam angle is changed and the reference beam angle which causes the SNR at that time to be the maximum is searched for. Then, in 602, a luminescent center position of the reproduction page on the photodetector is calculated. In the example of the photodetector in FIG. 13, the luminescent center position may be calculated by using, for example, an expression of (A−B)/(A+B) or an expression of (C−D)/(C+D). Thereafter, in 603, an installation error of the photodetector is calculated. Here, for example, the installation error when the luminescent center of the photodetector is positioned at the center is set as a zero installation error. Finally, in 604, a signal calculation expression is corrected by the installation error of each of the photodetectors. When the installation error of the photodetector 330 is set as d1 and the installation error of the photodetector 331 is set as d2, for example, the error signal in Expression 1 may be corrected as follows.

$$\text{Multiplexing perpendicular direction angular error signal} = (A-B)/(A+B) - d1 - (C-D)/(C+D) + d2 \quad \text{(Expression 2)}$$

In the method of this embodiment, since if position shift of a disc in the radial direction is generated when reproduction is performed, position shift of the reproduction page which is generated on the photodetector is canceled by applying the difference between the luminescent center in the photodetector 330 and the luminescent center in the photodetector 331, and thus there is an advantage in that the control signal is strong on disc position shift.

In the following descriptions, descriptions of parts which are common with the description of this embodiment will be omitted.

Embodiment 2

A second embodiment according to the invention will be described with reference to FIGS. 17 to 19. Since the configuration of an apparatus can be realized to be similar to that in Embodiment 1, description thereof will be omitted.

FIG. 17 indicates a schematic diagram illustrating the embodiment of the photodetector in the optical information recording and reproduction apparatus. The photodetector 330 or 331 is divided into, for example, two equal parts in the multiplexing direction, and light reception signals in the parts are respectively set as E, F, G, and H. At this time, a wavelength error signal is represented by, for example, the following expression.

$$\text{Wavelength Error Signal} = (E-F)/(E+F) - (G-H)/(G+H) \quad \text{(Expression 3)}$$

The number and disposition of divided parts of the light receiving surface in the photodetector are not limited to FIG. 17 and the number of divided parts may be two or more. In this case, the multiplexing perpendicular direction angular error signal may be generated by obtaining the luminescent center of a signal on the light receiving surface.

FIG. 18 indicates a diagram illustrating an example of a reproduction page when wavelength deviation and angle shift in the reference beam multiplexing direction are applied. When an amount of the angle shift in the multiplexing direction exists, the luminescent center of the reproduction page has horizontal (multiplexing direction) displacement by generating the wavelength deviation. Since a displacement amount of the luminescent center of the reproduction page has a size which varies due to a direction in which an offset of angle shift in the multiplexing direction is added, a difference between a center position when the offset is added in a negative direction, and a center position when the offset is added in a positive direction is calculated and thus an angular error signal in the multiplexing perpendicular direction may be generated.

Figure 19:
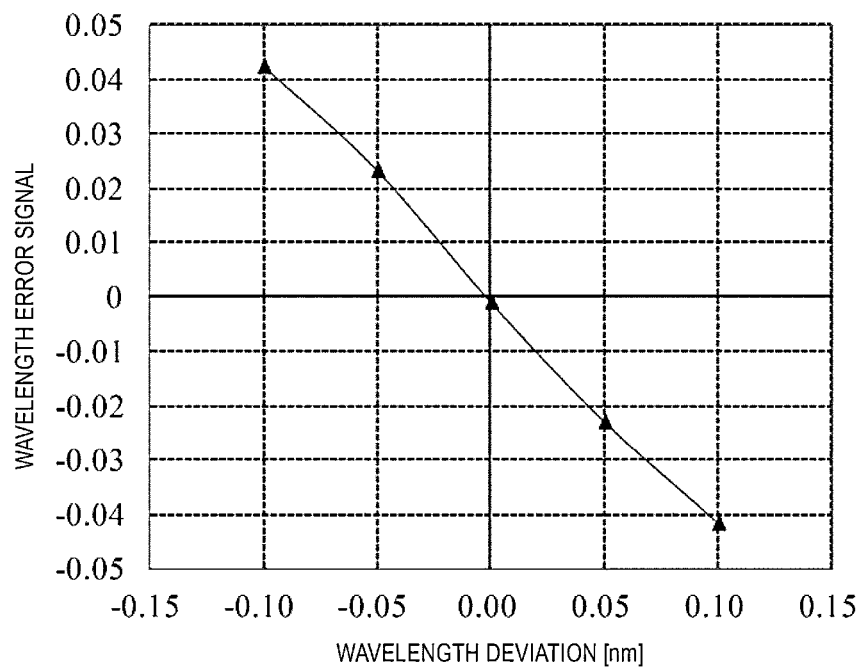
FIG. 19 is a diagram illustrating a simulation result of a wavelength error signal.

FIG. 19 indicates a diagram illustrating a simulation result of the wavelength error signal. This result means a result obtained by creating an error signal through simulation by using Expression 3. The error signal becomes an S-shaped signal varying depending on the amount of wavelength deviation and it is understood that the error signal may be created by the invention.

In the method of this embodiment, since if position shift of a disc in a tangential direction is generated when reproduction is performed, position shift of the reproduction page generated on the photodetector is canceled by applying the difference between the luminescent center in the photodetector 330 and the luminescent center in the photodetector 331, and thus there is an advantage in that the control signal is strong on disc position shift.

Embodiment 3

A third embodiment according to the invention will be described with reference to FIG. 20. Since the configuration of an apparatus can be realized to be similar to that in Embodiment 1, description thereof will be omitted.

Figure 20:
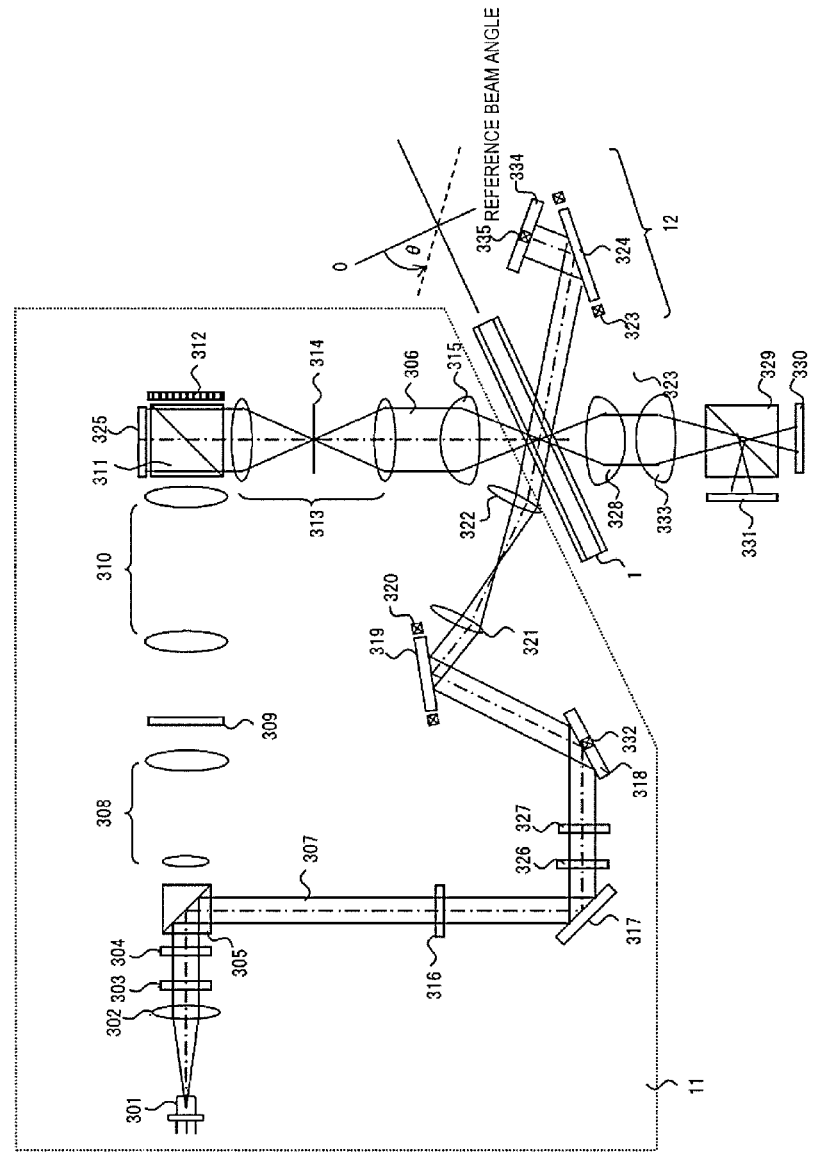
FIG. 20 is a schematic diagram illustrating an embodiment of a pickup in an optical information recording and reproduction apparatus.

FIG. 20 indicates a schematic diagram illustrating the embodiment of the pickup in the optical information recording and reproduction apparatus. An optical system in this embodiment is different from the optical system in Embodiment 1 in that a lens 333 is added. The lens 328 causes light to become collimated light and then the lens 333 causes the light to become convergent light. Then, the photodetector 330 and the photodetector 331 detect the light being in a state of diffuse light or convergent light which are defocused from a light condensing spot.

In the method according to this embodiment, an amount of defocus is adjusted in order to detect convergent light or diffuse light instead of collimated light and thus there is an advantage in that reduction of the size of the photodetector is enabled.

Embodiment 4

A fourth embodiment according to the invention will be described with reference to FIG. 21. Since the configuration of an apparatus can be realized to be similar to that in Embodiment 1, description thereof will be omitted.

Figure 21:
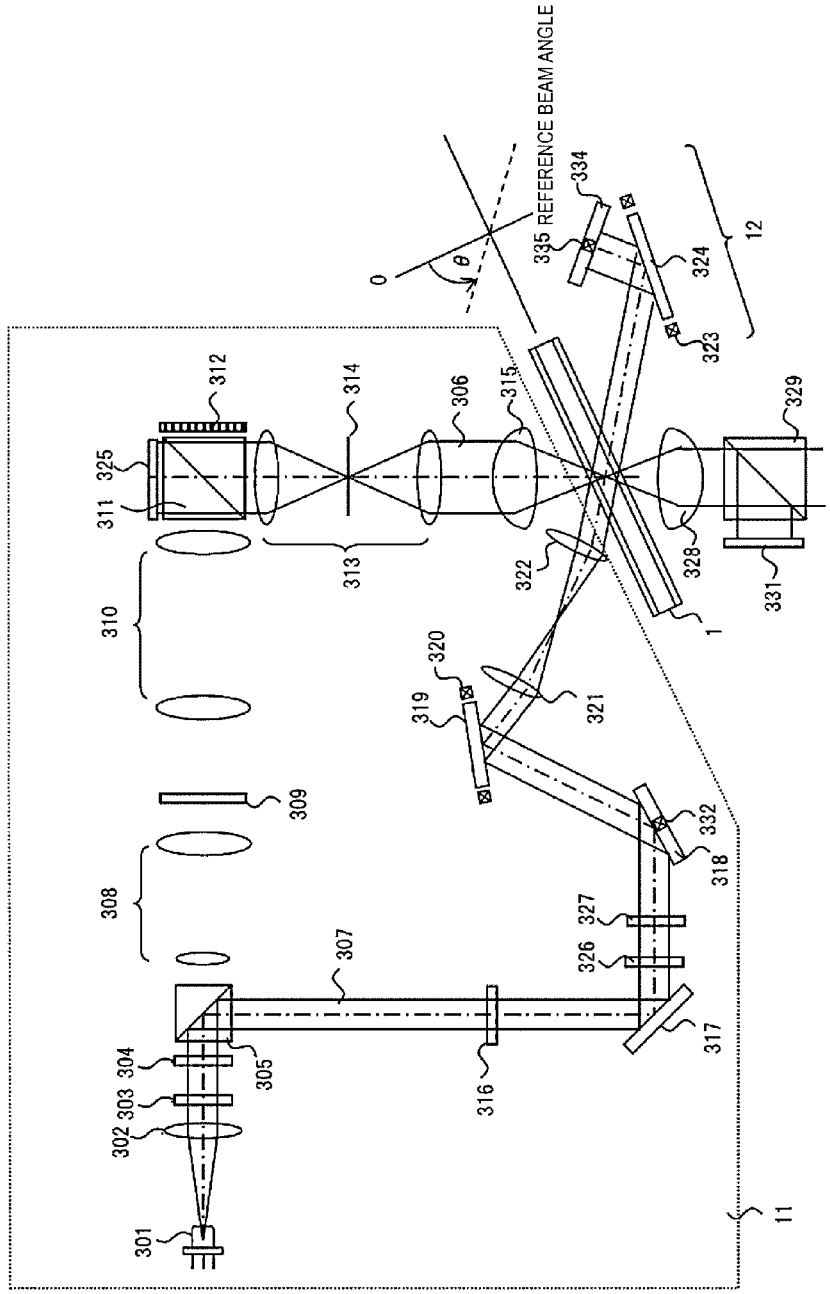
FIG. 21 is a schematic diagram illustrating an embodiment of the pickup in the optical information recording and reproduction apparatus.

FIG. 21 indicates a schematic diagram illustrating the embodiment of the pickup in the optical information recording and reproduction apparatus. This embodiment is different from Embodiment 1 in that the photodetector 330 is not included. In a case of this embodiment, an angle of p-polarized light for reproduction which is to be incident from the upper surface of the disc, in the multiplexing direction is set to be the optimal angle and an offset from the optimal angle is applied to an angle of s-polarized light for a servo in the multiplexing direction. Then, the galvano mirror 324 vertically reflects the reproduction p-polarized light and thus a page is reproduced at the optimal angle.

The multiplexing perpendicular direction angular error signal and the wavelength error signal are represented by the following expressions.

$$\text{Multiplexing Perpendicular Direction Angular Error signal} = (C-D)/(C+D) \quad \text{(Expression 4)}$$

Wavelength error signal=(G−H)/(G+H) (Expression 5) In the method according to this embodiment, since one photodetector is provided, there is an advantage in that realization can be performed with small numbers of components.

These above-described embodiments are not intended to limit the scope of the inventions. Obviously, many modifications may be embodied. For example, the embodiments were described in detail for easy understanding, and they are not limited to necessarily including all of the described components. Some components of one embodiment may be replaced with components of another embodiment and some components of another embodiment may be added to components of one embodiment. Some components of each embodiment may be applied as addition, removal, or replacement to or with components of the other embodiments.

Some or all of the above-described components, functions, processing units, processing means, and the like may be implemented with hardware obtained by performing designing with an integrated circuit, for example. The above-described components, functions, and the like may be realized with software by analyzing and executing a program for causing a processor to implement each function. Information of programs for implementing functions, tables, files, and the like may be stored in a storage device such as a memory, a hard disk, and a solid state drive (SSD), or a recording medium such as an IC card, an SD card, and a DVD.

A control line or an information line which is considered as necessary for explain is illustrated, it is not intended to illustrate all control lines or information lines which are necessary for a product. Practically, it may be considered that most components are connected to each other.

REFERENCE SIGNS LIST 1 optical information recording medium
2 bookcase
3 track
4 book
5 management area
10 optical information recording and reproduction apparatus
11 pickup
12 reproduction reference beam optical system
13 disc curing optical system
14 disc rotation angle detection optical system
81 access control circuit
82 beam source driving circuit
83 servo signal generation circuit
84 servo control circuit
85 signal processing circuit
86 signal generation circuit
87 shutter control circuit
88 disc rotation motor control circuit
89 controller
90 input and output control circuit
91 external control apparatus
92 multiplexing perpendicular angle correction device control signal generation circuit
93 multiplexing perpendicular angle correction device driving circuit
301 beam source
302 collimate lens
303 shutter
304 ½ wavelength plate
305 polarized optical beam splitter
306 signal beam
307 reference beam
308 beam expander
309 phase mask
310 relay lens
311 PBS prism
312 spatial light modulator
313 relay lens
314 spatial filter
315 objective lens
316 polarization direction conversion element
317 mirror
318 mirror
319 mirror
320 actuator
321 lens
322 lens
323 actuator
324 mirror
325 photodetector
326 wavelength plate
327 polarization splitting element
328 lens
329 PBS prism
330 photodetector
331 photodetector
332 actuator
333 lens
334 galvano mirror
335 actuator
501 beam source
502 collimate lens
503 shutter
504 optical element
505 PBS prism
506 signal beam
507 PBS prism
508 spatial light modulator
509 angle filter
510 objective lens
511 objective lens actuator
512 reference beam
513 mirror
514 mirror
515 lens
516 galvano mirror
517 actuator
518 photodetector
519 polarization direction conversion element
520 driving direction
521 optical block
522 photodetector
523 galvano mirror
524 actuator

The invention claimed is:

1. An optical information reproduction apparatus which reproduces information from an optical information recording medium by using holography, the apparatus comprising:
a laser beam source which generates a reference beam;
a multiplexing angle adjustment element which adjusts an angle of the reference beam in a multiplexing direction;
a perpendicular angle adjustment element which adjusts an angle of the reference beam in a direction perpendicular to multiplexing;
an imaging device which detects diffraction light which is to be reproduced from the optical information recording medium;
an optical axis division element which divides the reference beam into at least two reference beams having different angles in the multiplexing direction; and
a light detecting unit which has at least two light receiving surfaces or more detecting diffraction light which is reproduced by irradiating the optical information recording medium with the divided reference beams in a state where an angle of the divided reference beams in the multiplexing direction is shifted from an optimal angle.

2. The optical information reproduction apparatus according to claim 1, further comprising:
an angular error signal calculation circuit which generates an angular error signal in the direction perpendicular to multiplexing of the reference beam from a signal detected by the light detecting unit,
wherein the perpendicular angle adjustment element adjusts the angle of the reference beam in the direction perpendicular to multiplexing based on a signal output from the angular error signal calculation circuit.

3. The optical information reproduction apparatus according to claim 2, wherein
the angular error signal calculation circuit generates the angular error signal in the direction perpendicular to multiplexing of the reference beam, based on a luminescent center position of the diffraction light on the light detecting unit.

4. The optical information reproduction apparatus according to claim 2, wherein
the angular error signal calculation circuit learns an installation error amount in the light detecting unit, corrects a calculation expression for the angular error signal in the direction perpendicular to multiplexing, by using the installation error amount, and then generates the angular error signal.

5. The optical information reproduction apparatus according to claim 2, wherein
the light detecting unit is configured by Photodetector 1 for detecting a signal which is reproduced in a state where the angle of the reference beam in the multiplexing direction is shifted from the optimal angle in a positive direction, and Detector 2 for detecting a signal which is reproduced in a state where the angle of the reference beam in the multiplexing direction is shifted from the optimal angle in a negative direction.

6. The optical information reproduction apparatus according to claim 5, wherein
the angular error signal calculation circuit generates the angular error signal in the direction perpendicular to multiplexing of the reference beam, based on information of a difference between a luminescent center position of diffraction light on Photodetector 1 and a luminescent center position of diffraction light on Detector 2.

7. The optical information reproduction apparatus according to claim 1, further comprising:
a wavelength error signal calculation circuit which generates a wavelength error signal from a signal detected by the light detecting unit,
wherein the beam source adjusts a wavelength based on a signal output from the wavelength error signal calculation circuit.

8. The optical information reproduction apparatus according to claim 7, wherein
the wavelength error signal calculation circuit generates the wavelength error signal based on a luminescent center position of the diffraction light on the light detecting unit.

9. The optical information reproduction apparatus according to claim 7, wherein
the wavelength error signal calculation circuit learns an installation error amount in the light detecting unit, corrects a calculation expression for the wavelength error signal by using the installation error amount, and then generates the wavelength error signal.

10. The optical information reproduction apparatus according to claim 7, wherein
the light detecting unit is configured by Photodetector 1 for detecting a signal which is reproduced in a state where the angle of the reference beam in the multiplexing direction is shifted from the optimal angle in a positive direction, and Detector 2 for detecting a signal which is reproduced in a state where the angle of the reference beam in the multiplexing direction is shifted from the optimal angle in a negative direction.

11. The optical information reproduction apparatus according to claim 10, wherein
the wavelength error signal calculation circuit generates the wavelength error signal based on information of a difference between a luminescent center position of diffraction light on Photodetector 1 and a luminescent center position of diffraction light on Detector 2.

12. An optical information reproduction method of reproducing information from an optical information recording medium by using holography, the method comprising:
a laser emission process of generating a reference beam;
an optical axis division process of dividing the reference beam into at least two reference beams or more having different angles in a multiplexing direction;
a multiplexing angle adjustment process of adjusting the angle of the divided reference beams in the multiplexing direction;
a perpendicular angle adjustment process of adjusting an angle of the reference beam in a direction perpendicular to multiplexing;
an imaging process of detecting diffraction light which is to be reproduced from the optical information recording medium;
a detection process of causing a light detecting unit which has at least two light receiving surfaces or more, to detect diffraction light which is reproduced by irradiating the optical information recording medium with the reference beam in a state where an angle of the reference beam in the multiplexing direction is shifted from an optimal angle; and
an angular error signal calculation process of generating an angular error signal in a direction perpendicular to multiplexing of the reference beam, from a signal detected by the light detecting unit,
wherein in the perpendicular angle adjustment process, the angle of the reference beam in the direction perpendicular to multiplexing is adjusted based on a signal which is output in the angular error signal calculation process.

13. The optical information reproduction method according to claim 12, wherein
in the angular error signal calculation process, the angular error signal in the direction perpendicular to multiplexing of the reference beam is generated based on a luminescent center position of diffraction light on the light detecting unit.

14. An optical information reproduction method of reproducing information from an optical information recording medium by using holography, the method comprising:
a laser emission process of generating a reference beam;
an optical axis division process of dividing the reference beam into at least two reference beams or more having different angles in a multiplexing direction;
a multiplexing angle adjustment process of adjusting the angle of the divided reference beams in the multiplexing direction;
an imaging process of detecting diffraction light which is to be reproduced from the optical information recording medium;

a detection process of causing a light detecting unit which has at least two light receiving surfaces or more, to detect diffraction light which is reproduced by irradiating the optical information recording medium with the reference beam in a state where an angle of the reference beam in the multiplexing direction is shifted from an optimal angle; and a wavelength error signal calculation process of generating a wavelength error signal from a signal detected by the light detecting unit, wherein in the emission process, a wavelength is adjusted based on a signal which is output in the wavelength error signal calculation process.

15. The optical information reproduction method according to claim 14, wherein in the wavelength error signal calculation process, the wavelength error signal is generated based on a luminescent center position of diffraction light on the light detecting unit.

* * * * *